United States Patent [19]
Pederson

[11] Patent Number: 5,147,014
[45] Date of Patent: Sep. 15, 1992

[54] LUBRICATING SYSTEM FOR AN ENGINE PRIOR TO START-UP

[76] Inventor: Walter H. Pederson, 4600 64th St. S.E., St. Cloud, Minn. 56304

[21] Appl. No.: 727,841

[22] Filed: Jul. 9, 1991

[51] Int. Cl.⁵ .............................................. F01M 9/00
[52] U.S. Cl. ................................... 184/6.3; 184/45.1; 123/196 S; 137/599; 137/599.2
[58] Field of Search ................. 184/6.3, 6.4, 45.1, 184/45.2, 40, 41; 123/196 S, 196 R, 179.1, 179.3; 137/599, 599.2; 251/117

[56] References Cited

U.S. PATENT DOCUMENTS

| | | | |
|---|---|---|---|
| 2,225,539 | 12/1940 | Persson et al. | 184/6.3 |
| 2,736,307 | 2/1956 | Wilcox | 184/6.3 |
| 2,889,821 | 6/1959 | Maki | 184/6.3 |
| 3,556,070 | 12/1971 | Holcomb | 184/6.3 |
| 3,722,623 | 3/1973 | Waldecker | 123/196 S |
| 4,094,293 | 6/1978 | Evans | 184/6.3 |
| 4,359,140 | 11/1982 | Shreue | 184/6.3 |
| 4,825,826 | 5/1989 | Andres | 123/196 S |

FOREIGN PATENT DOCUMENTS 1052693  11/1983  U.S.S.R. .................. 184/6.3

*Primary Examiner*—Ira S. Lazarus
*Assistant Examiner*—Alan B. Cariaso
*Attorney, Agent, or Firm*—Olds & Goar

[57] ABSTRACT

A pre-start lubricating system for reducing wear in internal combustion engines delivers lubricating oil into an engine oiling system at a pressure greater than the engine's normal operating oil pressure before the engine is cranked. The pre-start lubricating system involves the engine's vacuum, electrical and oiling system. The pre-start lubrication system has a pressure vessel of desired volume with a vacuum communicator and an oil communicator with a first aperture. A piston inside the pressure vessel between the oil communicator and the vacuum communicator defines an oil storage reservoir and a vacuum reservoir. Connected to the piston is a piston spring for biasing the piston against oil pressure and vacuum and for raising oil pressure in the oil reservoir after the engine has been shut down and the vacuum in the vacuum reservoir has dissipated. A valve for controlling oil flow between the oil storage reservoir and the engine oiling system has a moveable core and a biasing spring for moving the core toward the first aperture. An actuator operates the valve for releasing oil held under pressure in the oil storage reservoir and has an electrical solenoid for moving the core away form the first aperture, a switch for energizing the solenoid, and a timer. Finally, a thermal pressure relief device in the valve relieves excess pressure created by thermal expansion of oil in the oil storage reservoir.

3 Claims, 3 Drawing Sheets

LUBRICATING SYSTEM FOR AN ENGINE PRIOR TO START-UP

BACKGROUND OF THE INVENTION

The present invention relates generally to a lubricating system for an engine, and more specifically to a lubricating system which is fully automatic and lubricates an engine prior to start-up of the engine and prior to actuation of the oiling system built into the engine. The lubricating system is charged by the oiling system built into the engine when the engine is running and utilizes engine oil stored under pressure in a reservoir for lubricating the engine prior to the next start-up.

Factory fresh engines installed in vehicles have an oiling system which is operational only after the engine has been started. Consequently, during start-up of an engine which permits its lubricating oil to drain down and be collected in an oil pan there will be a period of time during which the internal components of the engine will be moving before they are lubricated again. The Society of Automotive Engineers have performed tests which indicate that 90 percent of the wear in an engine occurs during start-up, i.e., before the internal components are lubricated by the oiling system built into the engine.

There have been a number of inventors who have recognized the problem of dry starting an engine and attempted to provide for adequate lubrication during the critical period when the engine is being cranked just prior to start-up and prior to actuation of the oiling system built into the engine. A preoiling system, depicted in U.S. Pat. No. 2,736,307, includes a turbine driving a high pressure pump for charging a reservoir with engine oil which is released by engagement of the starter switch. Another type of preliminary lubricating system, depicted in U.S. Pat. Nos. 2,755,787 and 3,422,807, releases oil from a reservoir as the ignition is activated. A pre-oiler with a solenoid valve, which can also be manually actuated, is shown in U.S. Pat. No. 3,556,070. U.S. Pat. No. 3,583,525 shows a preliminary lubricating device having a solenoid attached to a valve piston shaft for controlling the flow of oil into and out of a reservoir. A valve arrangement, depicted in U.S. Pat. No. 3,583,527, controls the charge and discharge of a reservoir of oil, under pressure, in response to the closing of the ignition switch. Another engine preoiler, disclosed in U.S. Pat. No. 4,061,204, includes a valve arrangement in the base of an accumulator having multiple ports, some of which are closed in one position of the valve and some of which are always open. U.S. Pat. No. 4,094,293 depicts an engine pre-oiler with a reservoir for containing engine oil under pressure controlled by valve which in turn is controlled by the engine's oil pressure sensor unit. Yet another pre-lube device, depicted in U.S. Pat. No. 4,112,910, shows a holding mechanism for a coiled power spring which is released on actuation of the ignition system whereupon oil in a chamber is evacuated and used to lubricate an engine. Finally, a pre-lubrication system, depicted in U.S. Pat. No. 4,703,727, shows a high pressure oil pump, controlled by an ignition switch and an oil pressure sensor, for supplying oil to an engine prior to start-up.

Each of the above noted patents deals with the problem of dry start-up of an engine either in an ineffective manner or by way of complex and costly apparatus. Accordingly, there has continued to be a need for a lubricating system for the lubrication of an engine prior to start-up which is effective, simple, inexpensive to manufacture and which is easy to install on an existing engine without major modifications of the engine assembly.

SUMMARY OF THE INVENTION

The instant invention solves the problems encountered in the prior art arrangements with a lubricating system which is fully automatic. The system includes a chamber having a reservoir defined by a spring loaded piston and a controllable valve arrangement for controlling the flow of oil into and out of the reservoir. The reservoir is charged with lubricating oil by the oiling system built into the engine with a vacuum assist for situations where the oil pressure of the engine is insufficient to fully charge the reservoir. Pressure relief is provided for in those situations where there is excessive oil pressure, e.g., high pressure due to thermal expansion.

Accordingly, it is an object of the present invention to provide a lubrication system for an engine which is fully automatic.

It is another object of the instant invention to provide a lubrication system for an engine which lubricates the engine by charging the oiling system of the engine prior to start-up.

Yet another object of the invention is to provide a lubrication system which is recharged by the engine the previous running period of the engine.

Another object of this invention is to provide a lubrication system which includes a solenoid operated valve arrangement for controlling flow of oil into and out of an oil reservoir.

It is also an object of this invention to provide a lubrication system which includes a timer mechanism in an electrical circuit for controlling a valve arrangement for the system.

It is an object of this invention to provide a lubrication system which overcomes the problems of lubrication systems for lubricating an engine prior to start-up which is efficient and economical.

Other objects and advantages of the present invention will be apparent and understood from the following detailed description when taken in conjunction with the accompanying drawings.

BRIEF DESCRIPTION OF THE DRAWINGS

FIG. 4 is a partial sectional view of one embodiment of a relief valve for relieving excessive pressure in the reservoir; and FIG. 5 is a partial sectional view of another embodiment of a relief valve for relieving excessive pressure in the reservoir.

DETAILED DESCRIPTION OF THE PREFERRED EMBODIMENT

Figure 1:
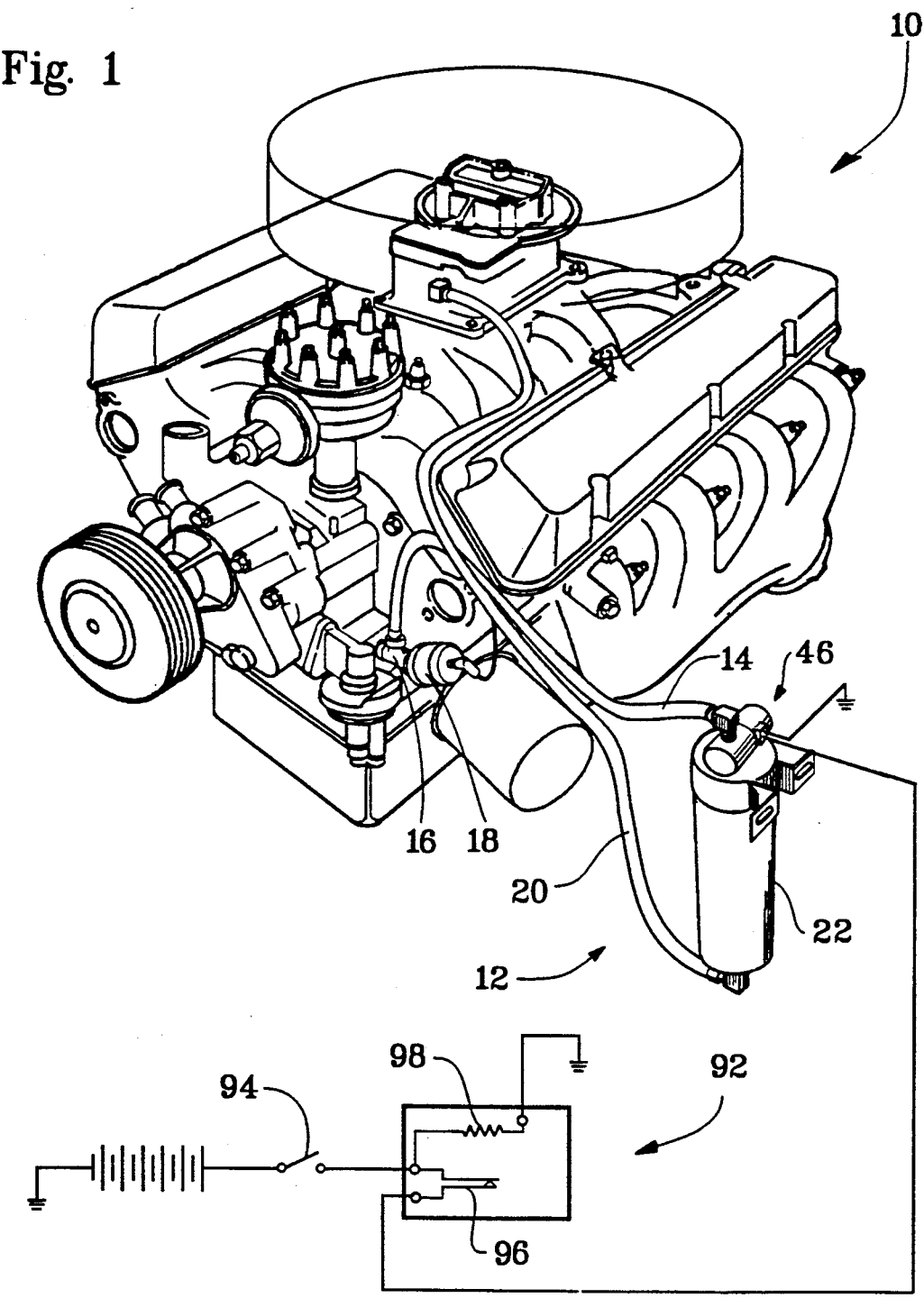
FIG. 1 shows a typical installation on an engine of a lubricating system constructed in accordance with the instant invention, a schematic of the electrical control circuitry is also depicted.

Reference hereinbelow is made to the drawings wherein like reference numerals have been employed to designate the same or similar components throughout the various views.

Referring now to FIG. 1, an engine 10 includes a lubricating system 12 for lubrication of the engine with engine oil just prior to start-up and prior to actuation of an oiling system built into the engine.(not shown) The lubricating system 12 uses oil from the engine's built in lubricating system and is connected to the engine's oiling system by hose 14 which is connected to tee 16 installed between the engine 10 and the engine's oil pressure sensor 18. Lubricating system 12 is also connected to a vacuum system onto the engine 10 by vacuum hose 20, which will be discussed in greater detail later. Vacuum sources can, for example, include either vacuum at the base of the carburetor or a manifold vacuum connection for a gasoline engine on a vacuum pump for a diesel engine.

Figure 2:
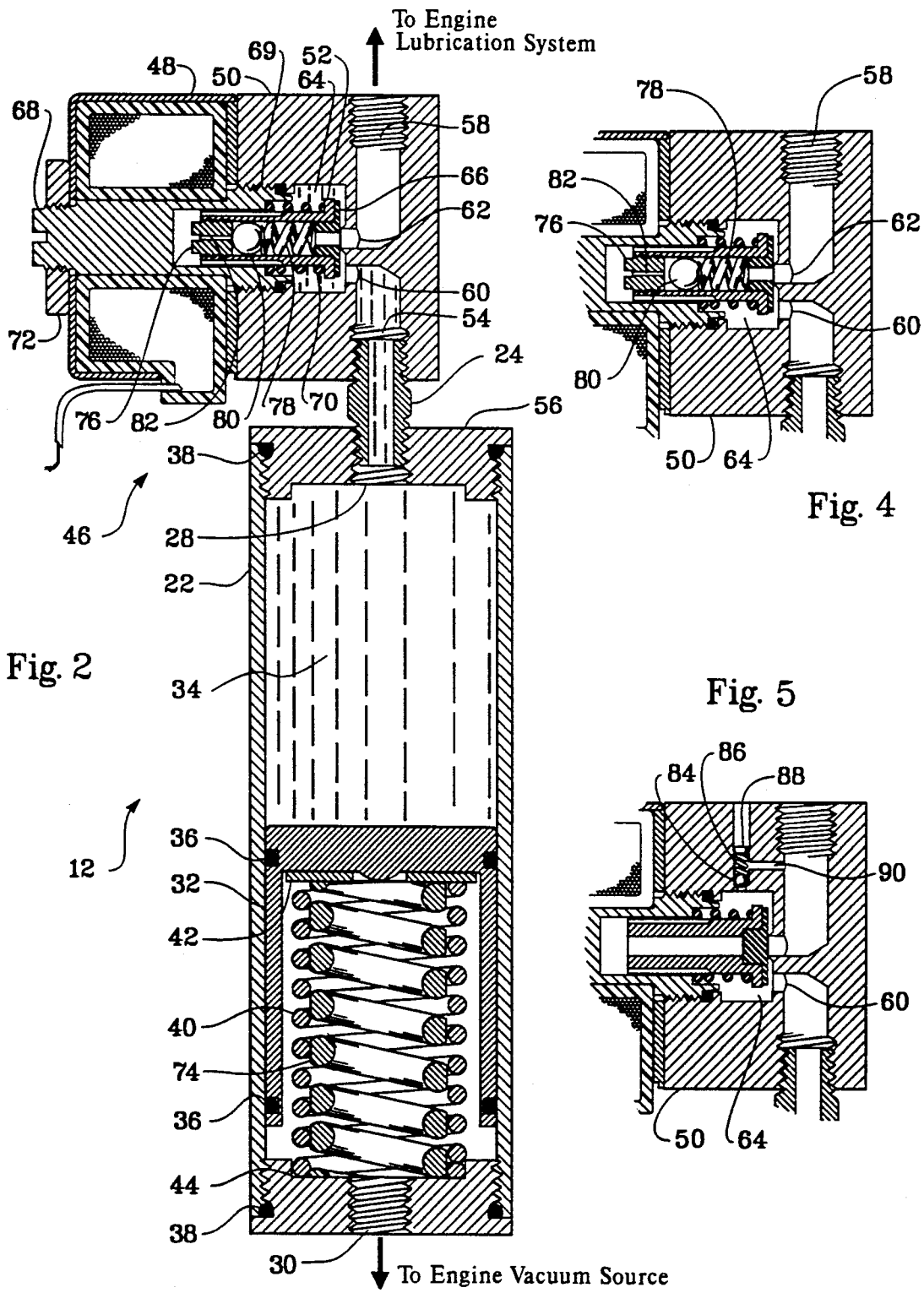
FIG. 2 is a cross sectional view through the apparatus of the instant invention with the reservoir charged and the valve arrangement closed.
Figure 3:
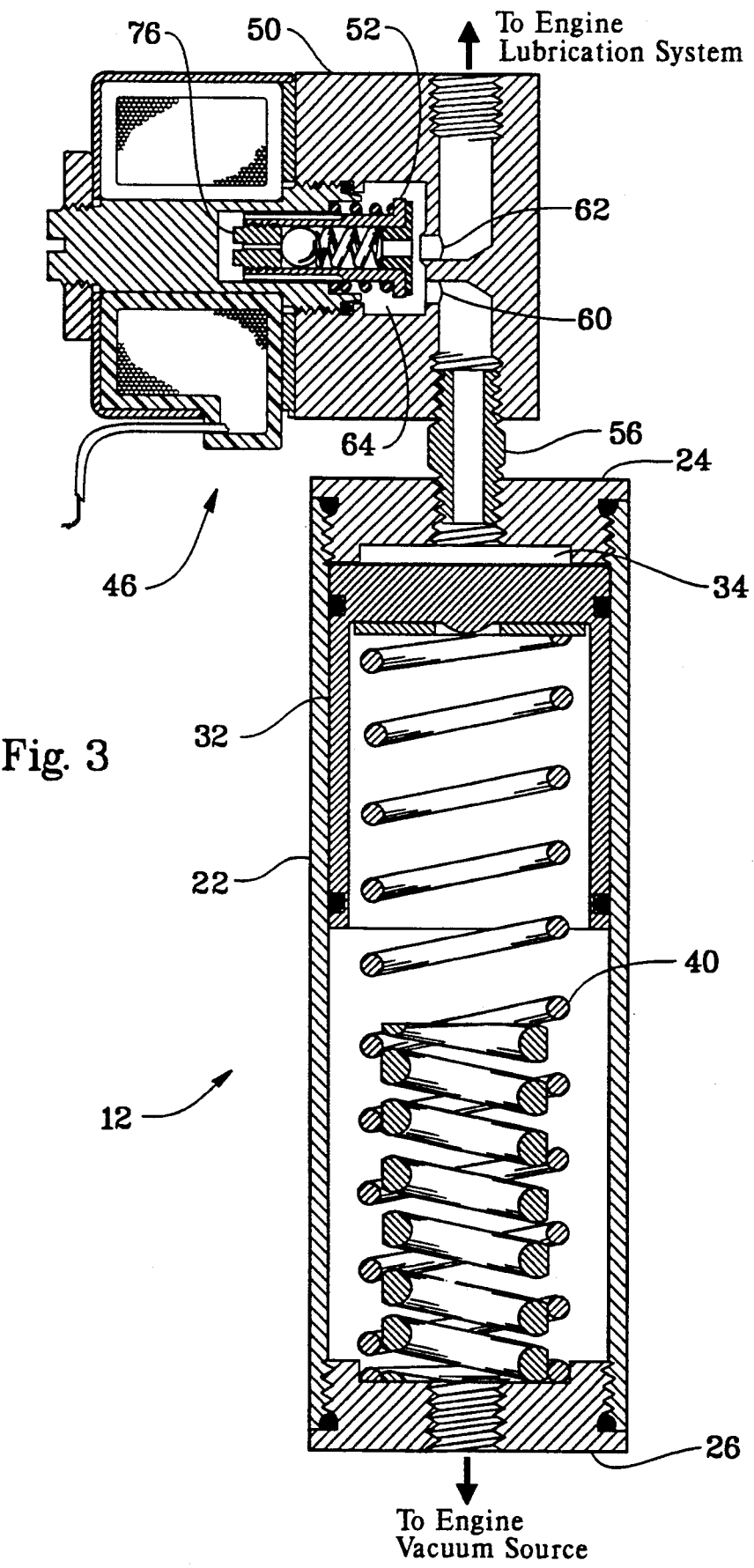
FIG. 3 is a cross sectional view similar to FIG. 2 with the valve arrangement open and the reservoir evacuated.

Lubrication system 12 includes a tubular chamber 22 having an end cap 24 at one end and an end cap 26 in the other end. (see FIGS. 2 and 3) The end caps can be attached to the tubular chamber 22 by any suitable means and preferably are threaded so as to be removable. End caps include threaded bores 28 and 30, respectively for the attachment of hose 14 and vacuum hose 20. Contained within tubular chamber 22 is a piston 32 which, with the tubular chamber 22, forms a reservoir 34. Piston 32 preferably includes seals 36 and it has been found that end caps 24 and 26 also, should have seals 38 when the end caps are make so as to be removable. A spring 40, beneath the piston, rests against a washer 42 for spreading the force of spring 40 evenly over the bottom of the piston. Spring 40 is positioned relative to end cap 26 by a recess 44 and is for the purpose of biasing the piston 32 away from end cap 26 toward end cap 26. Accordingly, the size of the reservoir 34 will vary depending on the position of the piston 32 relative to end cap 24.

Reservoir 34 is connected by way of hose 14 to the oiling system of engine 10 and includes a solenoid operated valve arrangement 46 disposed between it and hose 14. Solenoid operated valve arrangement 46 includes a solenoid coil 48, a valve body 50 and a movable core which is valve 52. Valve body 50 has a first threaded bore 54 connected to reservoir 22 by a threaded nipple 56 and a second threaded bore 58 to which hose 14 is attached. Bores 54 and 58 are interconnected by apertures 60 and 62 communicating with a valve chamber 64. Aperture 62 is controlled by face 66 of moveable core 52 such that oil is permitted to flow through the valve chamber 64 when first aperture 62 is open. A valve guide 68 is threaded into valve body 50 at 69 for defining the valve chamber 64 within which moveable core 52 moves. Spring 70 biases the face 66 on moveable core 52 into a controlling relationship with first aperture 62. Solenoid coil 48 is received over valve guide 68 and is fixed relative thereto by a threaded nut 72.

It has been found that when reservoir 22 is fully charged by the built in oiling system of the engine when the engine is cold, that there is thermal expansion of the oil contained in the reservoir after the engine warms up which may create excessive pressure in the reservoir. One approach to relieving excessive pressure in reservoir 22 is to include a heavier secondary spring 74 under piston 32 such that when pressures exceed a predetermined amount the heavier secondary spring 74 will engage the back side of piston 32 and absorb additional energy. Another approach to pressure relief is to include a relief valve 76 built into movable valve 52. Relief valve 76 includes a spring 78 biasing a check ball 80 for closing a passageway 82. Excessive pressure within reservoir 34 will overcome the pressure exerted by spring 78 against check ball 80 thereby causing check ball 80 to move from its position blocking passageway 82 and permit a quantity of oil to pass back into the oiling system built into the engine to reduce the excessive pressure to a predetermined pressure.(See FIGS. 2 and 4) Yet another approach to pressure relief, depicted in FIG. 5, utilizes a check ball 84 biased by a spring 86 which is located by a plug 88 for controlling the return of oil to the lubricating system built into the engine by way of passageway 90. When excessive pressure in reservoir 34 occurs the pressure exerted by spring 86 against check ball 84 is overcome and, again, a quantity of oil is permitted to return to the built in oiling system of the engine to thereby reduce the pressure in the reservoir.

Solenoid coil 48 is preferably controlled by a timer mechanism 92, the circuit diagram for which is seen in FIG. 1. Timer mechanism 92 is actuated either by a separate switch 94 installed within the driver's area in the vehicle or by connection to the ignition system for the engine. The timer mechanism preferably includes a bimetallic switch 96 actuated by a heating element 98 such that when switch 94, or when switch 94 is part of the ignition switch for the engine, is closed, the timer mechanism is activated.

In operation, reservoir 34 is charged with oil and ready to be used for the lubrication of engine 10 each time the engine is run by the oiling system built into the engine and is ready to lubricate the engine prior to the next start-up. At the time of installation reservoir 34 can be precharged and ready for operation. The, oiling system built into the engine pressurizes oil through first aperture 62 causing moveable core 52 to be moved against spring 70 thereby permitting the flow of engine oil from the built in engine oiling system into reservoir 34. The pressure in the built in system in the engine will fill reservoir 34 with oil forcing piston 32 to be moved against the pressure exerted against spring 40. In situations where the engine oiling system has insufficient pressure to completely charge reservoir 34, the assist provided in retracting piston 32 by a vacuum being drawn on the back side of the piston through vacuum hose 20 insures that a complete charging of reservoir 34 occurs. When pressure within the reservoir generally equals the pressure in the engine oiling system, valve 52 is closed by spring 70 and the system is ready for its next usage. Ideally, the reservoir has about sixty psi of pressure and spring 74 is provided to assist in absorbing excessive pressures up to pressures of about 100 psi. In situations where pressures within reservoir 34 exceed 100 psi, pressure relief valves as described above permit the return of a quantity of oil from the reservoir to the engine oiling system to reduce the pressure within the reservoir to about 60 psi. On closing of switch 94, or in the alternative, operation of the switch built into the ignition system, timer 92 is activated simultaneously with solenoid coil 48. Valve 52 is retracted from aperture 62 permitting the spring 40 to cooperate with piston 32 to evacuate the engine oil from reservoir 34 into the built in lubricating system of the engine thereby lubricating the engine prior to start-up and prior to actuation of the engine oiling system. Timer 92 preferably limits the energizing of solenoid coil 48 to between 11 and 20 seconds. It has been found that ideally spring 40 should evacuate reservoir 34 within 8 seconds or less at which time the engine is started and reservoir 34 is recharged. It has been found that keeping aperture 62 open subsequent to start-up long enough for the engine oiling system to recharge the reservoir completely will maximize the quantity of oil contained within the reservoir. Lubricating system 12 and timer 92 can be mounted within the engine compartment in any convenient location away from engine components which generate excessive amounts of heat. In those situations where thermal expansion of the oil contained within the reservoir occurs, spring 74 and either of the chosen relief valves will take care of excessive pressures within the reservoir.

While this invention has been described with a certain degree of particularity, it is manifest that many changes may be made in the details of construction and in the arrangement of components without departing from the spirit and scope of the disclosure. It is understood that the invention is not limited to the embodiments set forth herein for purposes of exemplification, but is limited only by the scope of the attached claims, including the full range of equivalency to which each element is entitled.

What is claimed is:

1. A pre-start lubricating system for reducing wear in a diesel, gasoline or other internal combustion engine by delivering lubricating oil into the engine's oiling system immediately before the engine is cranked at a pressure greater than the engine's normal operating oil pressure, thereby preventing excessive wear due to dry friction at start-up and extending the useful life of the engine, said pre-start lubricating system to be used in connection with the engine vacuum system, the engine electrical system and the engine oiling system associated with, or incorporated into, the internal combustion engine, said pre-start lubrication system comprising:

(a) a pressure vessel of desired volume having a vacuum communication means, as further defined, and an oil communication means, as further defined;

(b) a piston, biased by a spring means as further defined, disposed within said pressure vessel between said oil communication means and said vacuum communication means defining
 (1) an oil storage reservoir between said oil communication means and said piston and
 (2) a vacuum reservoir between said vacuum communication means and said piston;

(c) a vacuum communication means for connecting said vacuum reservoir with the engine vacuum system;

(d) an oil communication means for connecting said oil storage reservoir with the engine oiling system, said oil communication means having a first aperture opening;

(e) a valve means disposed adjacent to said first aperture for controlling flow of oil to and from said oil storage reservoir and the engine oiling system, further comprising;
 (1) a moveable core;
 (2) a biasing spring which acts to force said moveable core toward said first aperture;

(3) said moveable core is moved away from said first aperture when pressure in the engine oiling system exceeds reservoir pressure by an amount sufficient to overcome the force exerted on said moveable core by said biasing spring, and
 (4) said moveable core is seated against said first aperture by said biasing spring when reservoir pressure is at least equal to engine oiling system pressure;

(f) a piston spring means operatively connected to said piston
 (1) for biasing said piston by providing a force on said piston acting in opposition to the combination of the forces of said piston created by the action of oil pressure in said oil reservoir and vacuum in said vacuum reservoir, and
 (2) further, for raising the oil pressure in said oil storage reservoir after the engine has been shut down and the vacuum in the vacuum reservoir has dissipated;

(g) actuator means for operating said valve means thereby releasing oil held under pressure in said oil storage reservoir, further comprising;
 (1) an electrical solenoid, adapted for connection to the engine electrical system, operatively connected to said moveable core so as to urge said moveable core away from said first aperture when said solenoid is energized, thereby releasing oil stored in said oil storage reservoir;
 (2) a switch means, disposed at a location convenient to the person operating the engine, for energizing said solenoid;
 (3) a timer means electrically disposed between said switch means and said solenoid for controlling said solenoid in such a manner that
  (A) said solenoid is energized and thereby holds said moveable core away from said first aperture for a predetermined amount of time
   (1) which is longer than the amount of time required for complete evacuation of said oil storage reservoir, and
   (2) for a time sufficient to permit a substantially complete recharge of said oil storage reservoir after engine start-up, and
  (B) said solenoid is then de-energized permitting oil pressure in said oil storage reservoir and the bias induced by said biasing spring to urge said moveable core against, and thereby close, said first aperture; and (h) thermal pressure relief means disposed in said valve means for relieving excess pressure created by thermal expansion of oil in said oil storage reservoir.

2. A pre-start lubricating system as set forth in claim 1 wherein said timer means energizes said solenoid for a predetermined time of at least 11 seconds but less than 20 seconds and said spring means exerts sufficient force upon said piston to evacuate said oil storage reservoir in less than 8 seconds.

3. A pre-start lubricating system as set forth in claim 1 wherein a secondary spring means for biasing said piston, said secondary spring engages said piston when said oil storage reservoir is substantially filled with oil and act in concert with said spring means to accomodate thermal expansion of oil in said oil storage reservoir.

* * * * *